US011009078B2

(12) United States Patent
Gilliland et al.

(10) Patent No.: US 11,009,078 B2
(45) Date of Patent: May 18, 2021

(54) COMPRESSIBLE DRIVESHAFT

(71) Applicant: Bell Helicopter Textron Inc., Fort Worth, TX (US)

(72) Inventors: Colton Gilliland, Northlake, TX (US); Russell L. Mueller, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 298 days.

(21) Appl. No.: 15/961,609

(22) Filed: Apr. 24, 2018

(65) Prior Publication Data
US 2019/0323563 A1  Oct. 24, 2019

(51) Int. Cl.
*B64D 35/00* (2006.01)
*F16D 3/06* (2006.01)
*B64C 29/00* (2006.01)
*F16C 3/02* (2006.01)
*F16D 1/10* (2006.01)
*B64D 35/06* (2006.01)

(52) U.S. Cl.
CPC ............ *F16D 3/06* (2013.01); *B64C 29/0033* (2013.01); *B64D 35/06* (2013.01); *F16C 3/02* (2013.01); *F16D 1/10* (2013.01); *F16D 2001/103* (2013.01)

(58) Field of Classification Search
CPC ..... F16D 3/06; F16D 3/72; F16D 3/79; F16D 1/10; B64C 1/063; B64C 3/56
USPC ..................................................... 464/79, 99
See application file for complete search history.

(56) References Cited

U.S. PATENT DOCUMENTS

| | | | | |
|---|---|---|---|---|
| 4,460,058 A | * | 7/1984 | Welschof | B60B 27/0005 180/258 |
| 5,360,376 A | * | 11/1994 | Baldino | F16D 11/10 464/154 |
| 5,672,112 A | * | 9/1997 | Sbabo | B64C 27/82 403/325 |
| 6,146,022 A | * | 11/2000 | Sahashi | B60B 27/00 384/544 |
| 2008/0175526 A1 | * | 7/2008 | Langer | F16C 43/04 384/544 |
| 2011/0123264 A1 | * | 5/2011 | Wang | F16D 1/033 403/359.6 |
| 2016/0076629 A1 | * | 3/2016 | Modrzejewski | B64C 29/0033 244/17.11 |
| 2017/0058940 A1 | * | 3/2017 | Wehner | B21H 1/20 |
| 2017/0082150 A1 | * | 3/2017 | Uhrick | F16D 1/076 |
| 2017/0130776 A1 | * | 5/2017 | Uhrick | F16C 3/02 |
| 2017/0241472 A1 | * | 8/2017 | Walser | B21D 17/04 |

* cited by examiner

*Primary Examiner* — Richard G Davis
(74) *Attorney, Agent, or Firm* — Lightfoot & Alford PLLC

(57) ABSTRACT

A driveshaft includes a first end, a second end, and a length extending from the first end to the second end. The driveshaft includes an engagement section at the first end configured to cooperatively engage and transfer torque to a gearbox. The driveshaft also includes a compressible section configured to selectively decrease the length of the driveshaft. The driveshaft being configured to transition between an engaged configuration, wherein the engagement portion is engaged with the gearbox, and a disengaged configuration, wherein the compressible section is compressed, and the engagement portion is disengaged from the apparatus.

14 Claims, 11 Drawing Sheets

COMPRESSIBLE DRIVESHAFT

BACKGROUND

Many types of aircraft include elongated wings that extend laterally from a fuselage. These types of aircraft generally occupy a large amount of space and have a large overall footprint. As such, when these types of aircraft are not in use, they occupy an undesirably large amount of space to store them on aircraft carriers, in hangers, runways, and other spaces. And furthermore, access to hangars and/or other indoor maintenance or repair facilities may be restricted because some types of aircraft may not fit through the doors and/or entrances of such facilities. Accordingly, technology has been developed that allows for the rotation of the wing relative to the fuselage to minimize the footprint of the aircraft. One such example is disclosed in U.S. patent application Ser. No. 15/898,550, filed Feb. 17, 2018, titled Selectively Engageable Aircraft Driveshaft Off-Axis From Component Stow Axis, which is incorporated herein by reference in its entirety. The selectively engageable driveshaft is translated along its axis of rotation between an engaged and disengaged position by an actuator.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a compressible driveshaft configured to transition between an engaged configuration and a disengaged configuration. In the engaged configuration the compressible driveshaft is cooperatively engaged with and configured to transfer torque to an apparatus. In the disengaged configuration, the compressible driveshaft is compressed to a shorter length so that the compressible driveshaft is no longer engaged to drive the apparatus. While this disclosure describes the compressible driveshaft for use on an aircraft, its application is not so limited. It should be understood that the disclosed compressible driveshaft could be used with any application that may benefit from a disengageable driveshaft.

Figure 1:
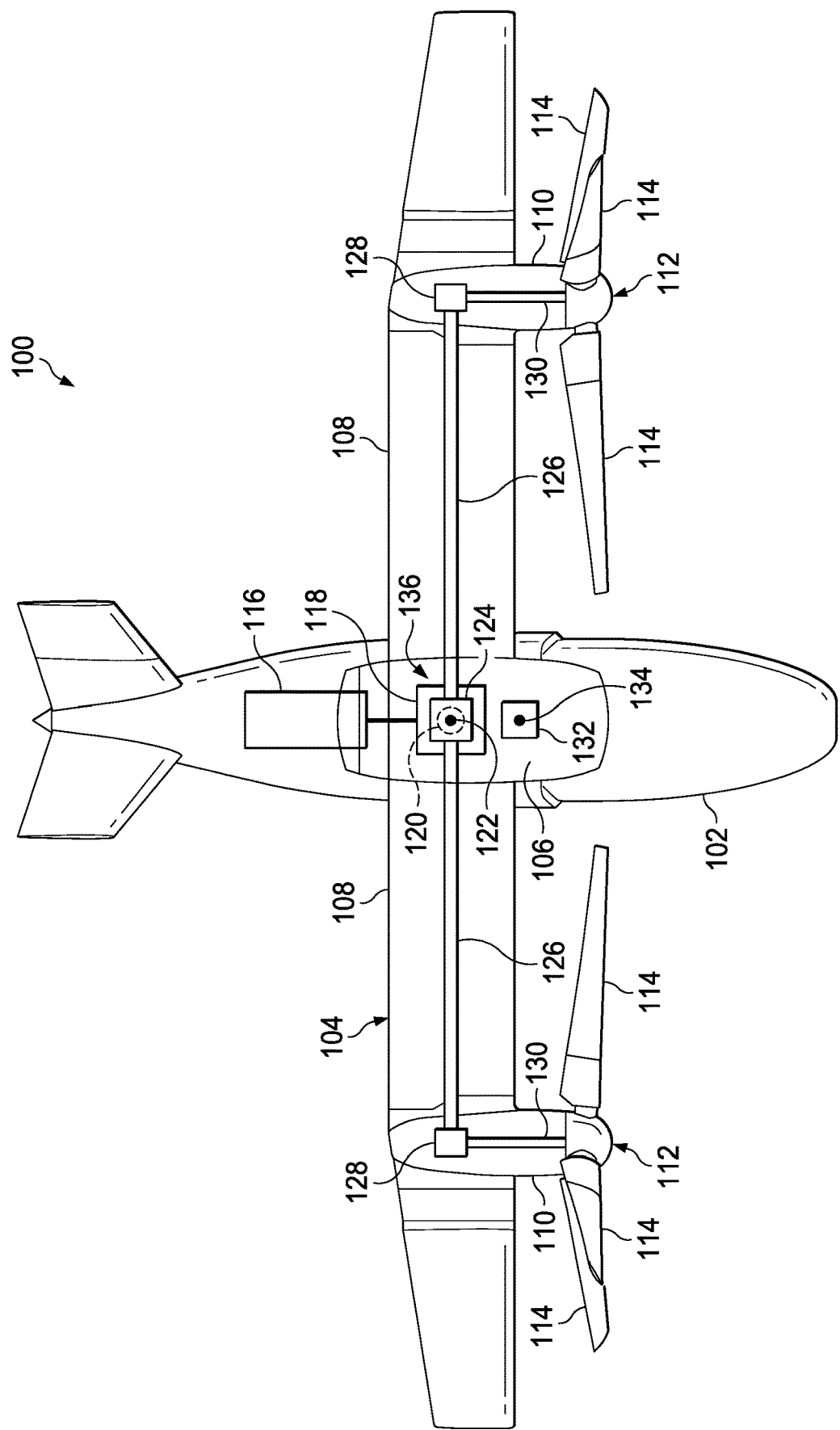
FIG. 1 is a top view of an aircraft according to this disclosure.

Referring now to FIG. 1, a top view of an aircraft 100 is shown according to this disclosure. Aircraft 100 is shown and described as a tiltrotor aircraft. However, aircraft 100 may be any type of vehicle. Aircraft 100 includes a fuselage 102 and a stowable wing assembly 104 including a rotatable wing body 106 and a plurality of wings 108 extending therefrom. Each wing 108 has a pylon 110 coupled thereto. Pylons 110 each include a rotor assembly 112 with a plurality of rotor blades 114. Each pylon 110 is rotatable between a horizontal orientation and a vertical orientation with respect to fuselage 102 and associated wing 108 to adjust the thrust angle and transition aircraft 100 between an airplane mode and a helicopter mode. Accordingly, the airplane mode is associated with a more horizontally-oriented thrust angle and propelling aircraft 100 forward in flight, while the helicopter mode is associated with a more vertically-oriented thrust angle and propelling aircraft 100 to and from a landing area.

Aircraft 100 also includes a drive component carried in fuselage 102. In the embodiment shown, the drive component includes an internal combustion engine 116 coupled to an engine reduction gearbox 118 which features a compressible driveshaft 120. However, in other embodiments, the drive component may comprise a direct-drive electric motor, a direct-drive engine, a motor and gearbox combination, or an engine and a redirection gearbox, each including compressible driveshaft 120. In the embodiment shown, operation of internal combustion engine 116 causes compressible driveshaft 120 to rotate about a rotation axis 122. Compressible driveshaft 120 is extended and compressed axially along rotation axis 122 to engage and disengage from an auxiliary or mid-wing gearbox 124 disposed within rotatable wing body 106 of wing assembly 104. Mid-wing gearbox 124 is operatively coupled to an interconnect driveshaft 126 extending therefrom through each wing 108 to a pylon gearbox 128 disposed in each pylon 110. Each pylon gearbox 128 is coupled to associated rotor assembly 112 through a rotor mast 130. Thus, when compressible driveshaft 120 is engaged with mid-wing gearbox 124, rotation of compressible driveshaft 120 imparted by internal combustion engine 116 is transmitted through mid-wing gearbox 124 to interconnect driveshafts 126 and rotor masts 130 to impart rotation to counter-rotating rotor assemblies 112. Conversely, when compressible driveshaft 120 is disengaged from mid-wing gearbox 124, rotation of compressible driveshaft 120 will not impart rotation to rotor assemblies 112. As such, compressible driveshaft 120 allows internal combustion engine 116 to operate to run pre-flight checks, provide electrical power, and/or provide functions of an auxiliary power unit without engaging rotor assemblies 112.

Aircraft 100 may also include a wing assembly rotation system 132 configured to rotate wing assembly 104 with respect to fuselage 102 about a stow axis 134. Most notably, stow axis 134 is offset from rotation axis 122 of compressible driveshaft 120. More specifically, stow axis 134 is displaced longitudinally along a length of fuselage 102 with respect to rotation axis 122 of compressible driveshaft 120. In some embodiments, the offset between stow axis 134 and rotation axis 122 may be about twelve inches. The location of rotation axis 122 is generally determined by the optimal placement of interconnect driveshafts 126 and/or mid-wing gearbox 124 within wing assembly 104. Stow axis 134 is generally selected to center wing assembly 104 over fuselage 102, thereby reducing the overall footprint of aircraft 100 when wing assembly 104 is rotated. Further, offsetting stow axis 134 further forward on wing assembly 104 may provide structural benefits, such as allowing rotation of wing assembly 104 in a thicker, more structurally rigid portion of wing assembly 104. Additionally, as will be discussed in more detail below, compressible driveshaft 120 must be capable of disengaging from mid-wing gearbox 124 and fully withdrawing from wing assembly 104 because stow axis 134 and rotation axis 122 are not co-axial. Because engine reduction gearbox 118, compressible driveshaft 120, mid-wing gearbox 124, and wing assembly rotation system 132 function together to facilitate the transition to a stowed configuration, they may be referred to collectively as a stow system 136.

Figure 2:
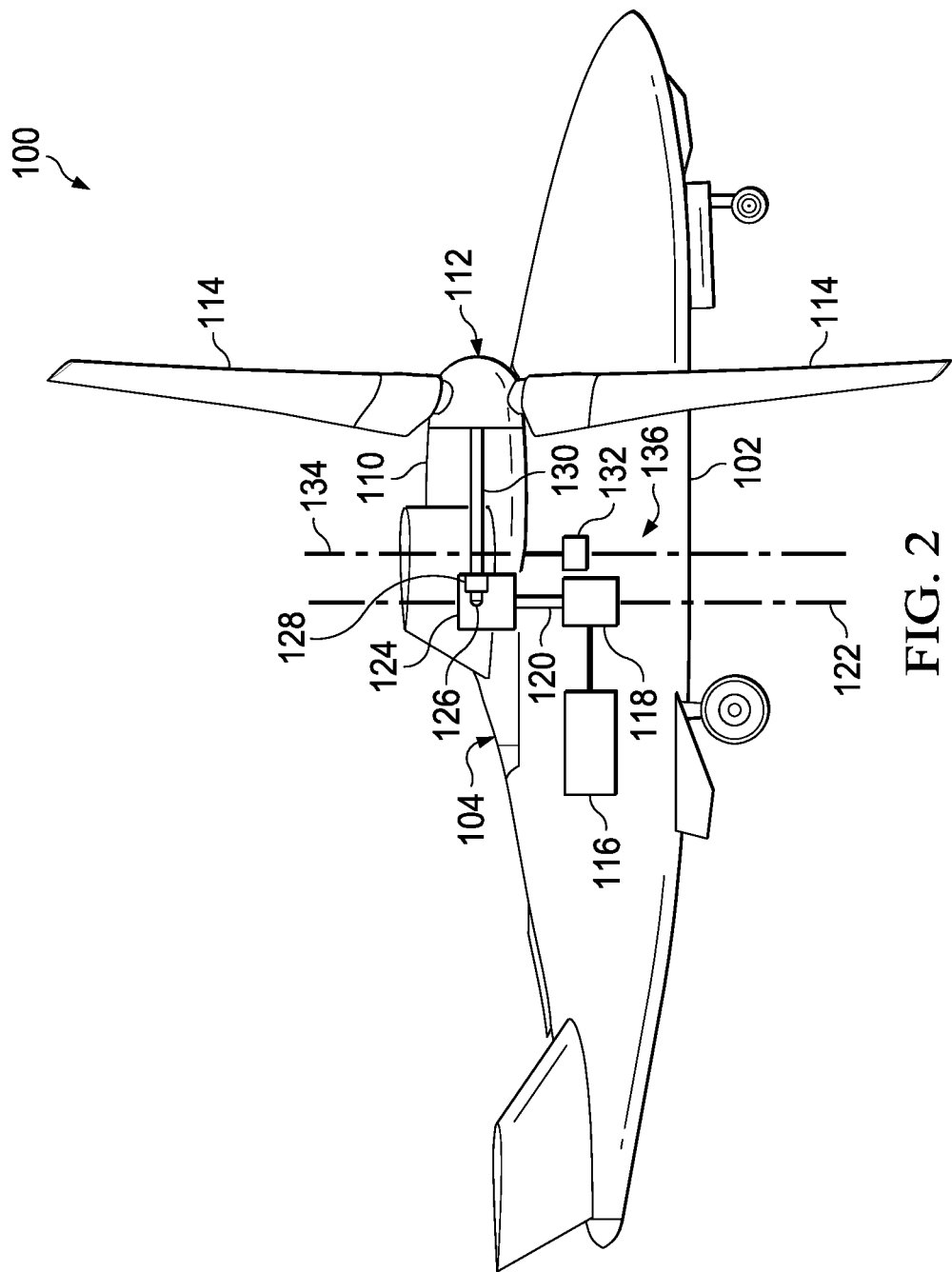
FIG. 2 is a side view of the aircraft of FIG. 1.

Referring now to FIG. 2, aircraft 100 is shown with compressible driveshaft 120 engaged with mid-wing gearbox 124 and wing assembly 104 in a flight position. As shown, compressible driveshaft 120 is expanded vertically to engage mid-wing gearbox 124 when wing assembly 104 is configured in the flight position. Thus, when compressible driveshaft 120 is engaged with mid-wing gearbox 124, rotational motion of compressible driveshaft 120 imparted by internal combustion engine 116 is transferred through mid-wing gearbox 124 to interconnect driveshafts 126 and rotor masts 130 to impart rotation to counter-rotating rotor assemblies 112 to propel aircraft 100.

Figure 3:
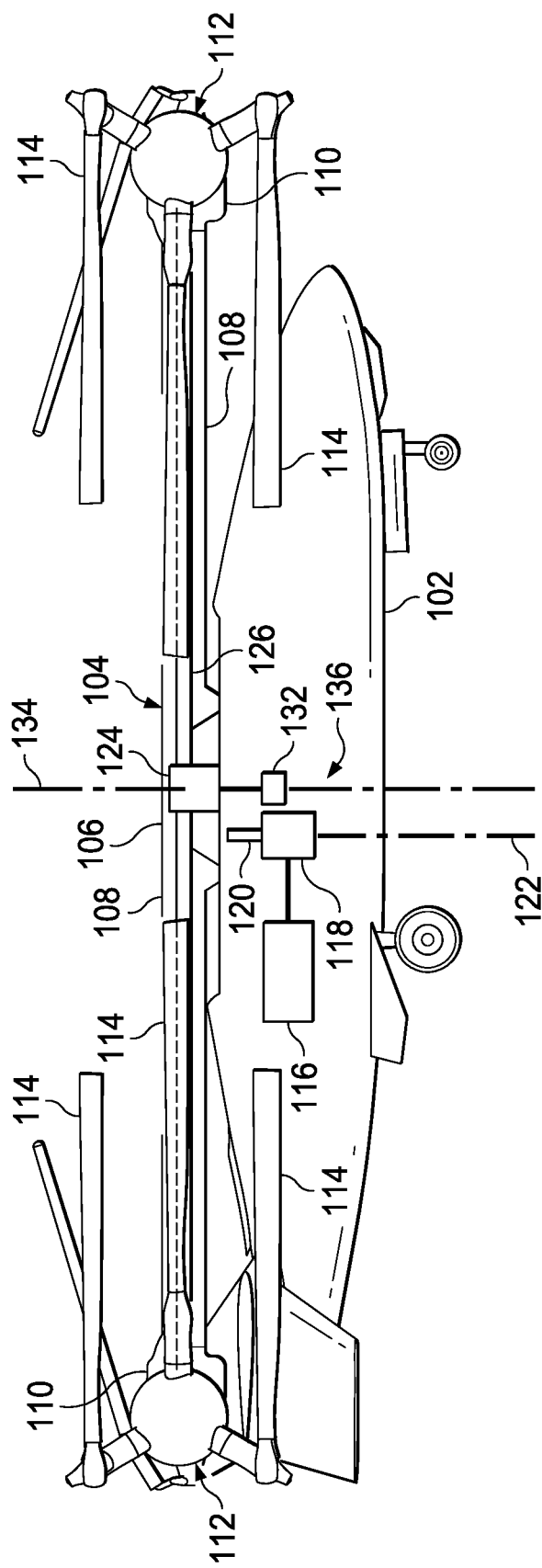
FIG. 3 is another side view of the aircraft of FIG. 1.

Referring now to FIG. 3, aircraft 100 is shown with compressible driveshaft 120 disengaged from mid-wing gearbox 124 and wing assembly 104 in a stowed position. As shown, compressible driveshaft 120 is compressed vertically to disengage from mid-wing gearbox 124. After compressible driveshaft 120 is disengaged from mid-wing gearbox 124, wing assembly 104 may be rotated relative to fuselage 102 about stow axis 134 in a clockwise direction as viewed from the top of aircraft 100 until wing assembly 104 reaches the stowed position. In the stowed position, compressible driveshaft 120 is misaligned from mid-wing gearbox 124. In some embodiments, the stowed configuration of wing assembly 104 may be reached after wing assembly 104 is rotated about ninety degrees. Furthermore, wing assembly 104 may be rotated relative to fuselage 102 about stow axis 134 in a counter-clockwise direction.

Figure 4A:
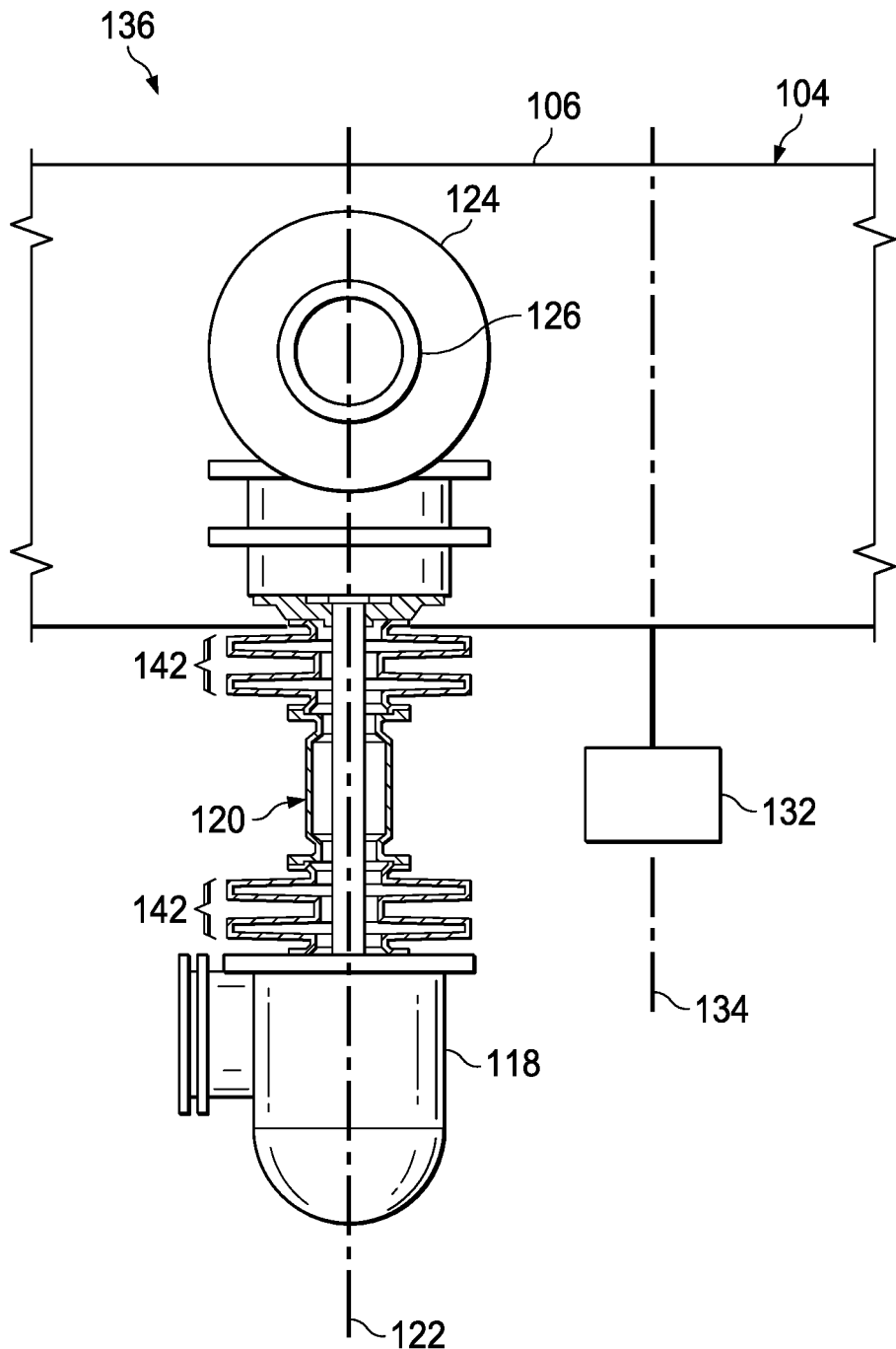
FIG. 4A is a side view of a stow system of the aircraft of FIG. 1 in an engaged position.
Figure 4B:
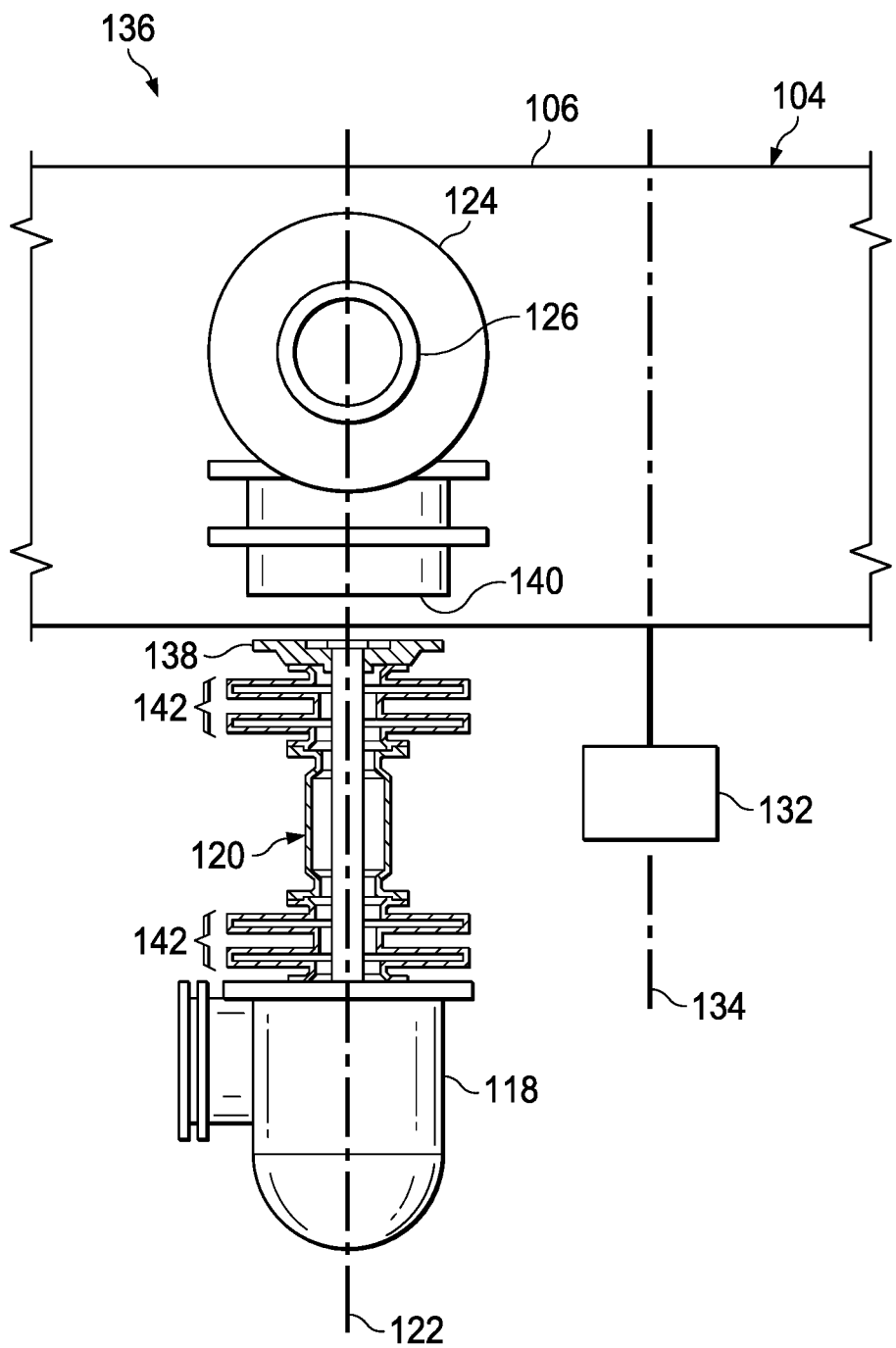
FIG. 4B is a side view of the stow system of the aircraft of FIG. 1 in a disengaged position.
Figure 4C:
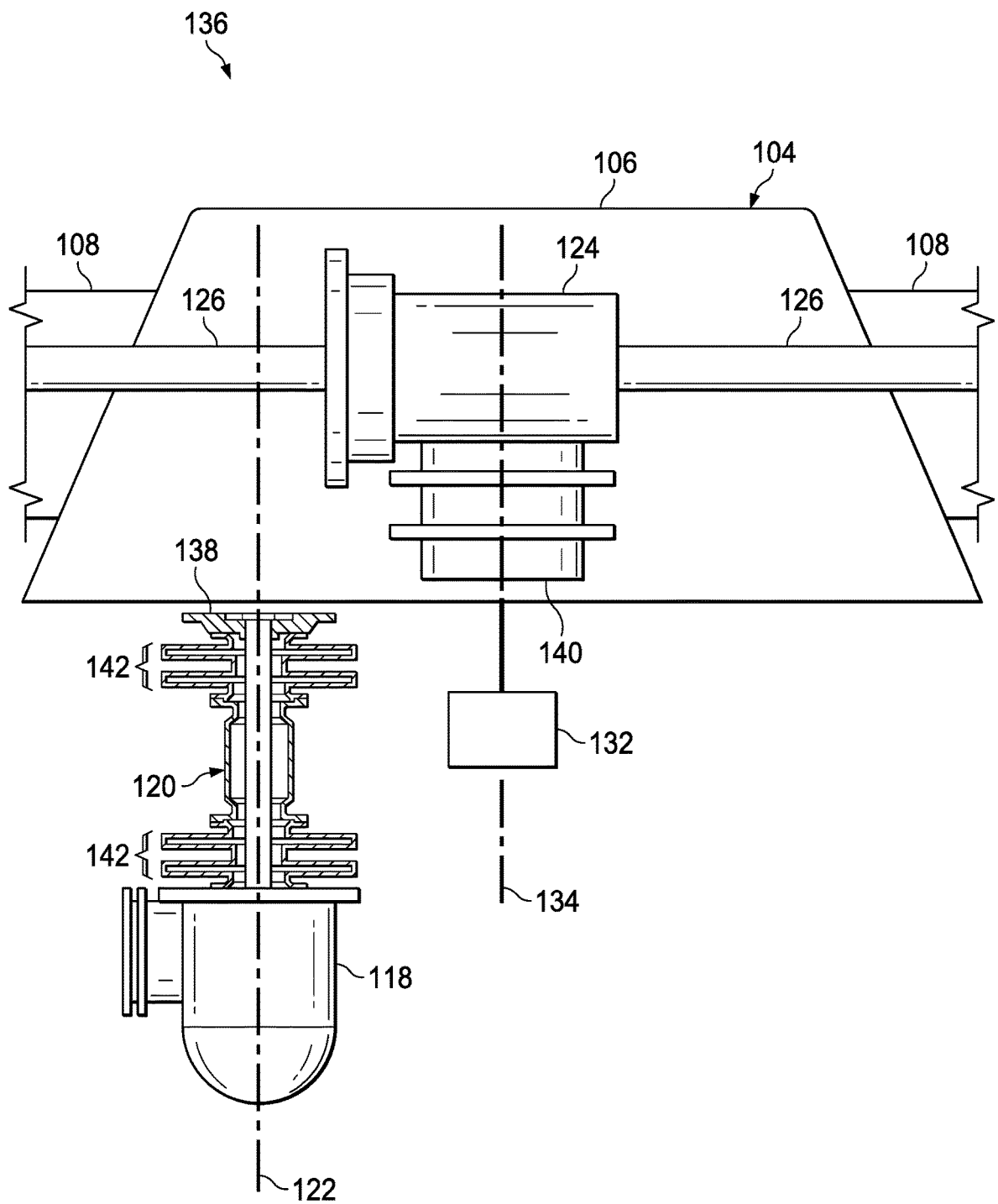
FIG. 4C is a side view of the stow system of the aircraft of FIG. 1 in the disengaged and stowed position.
Figure 5A:
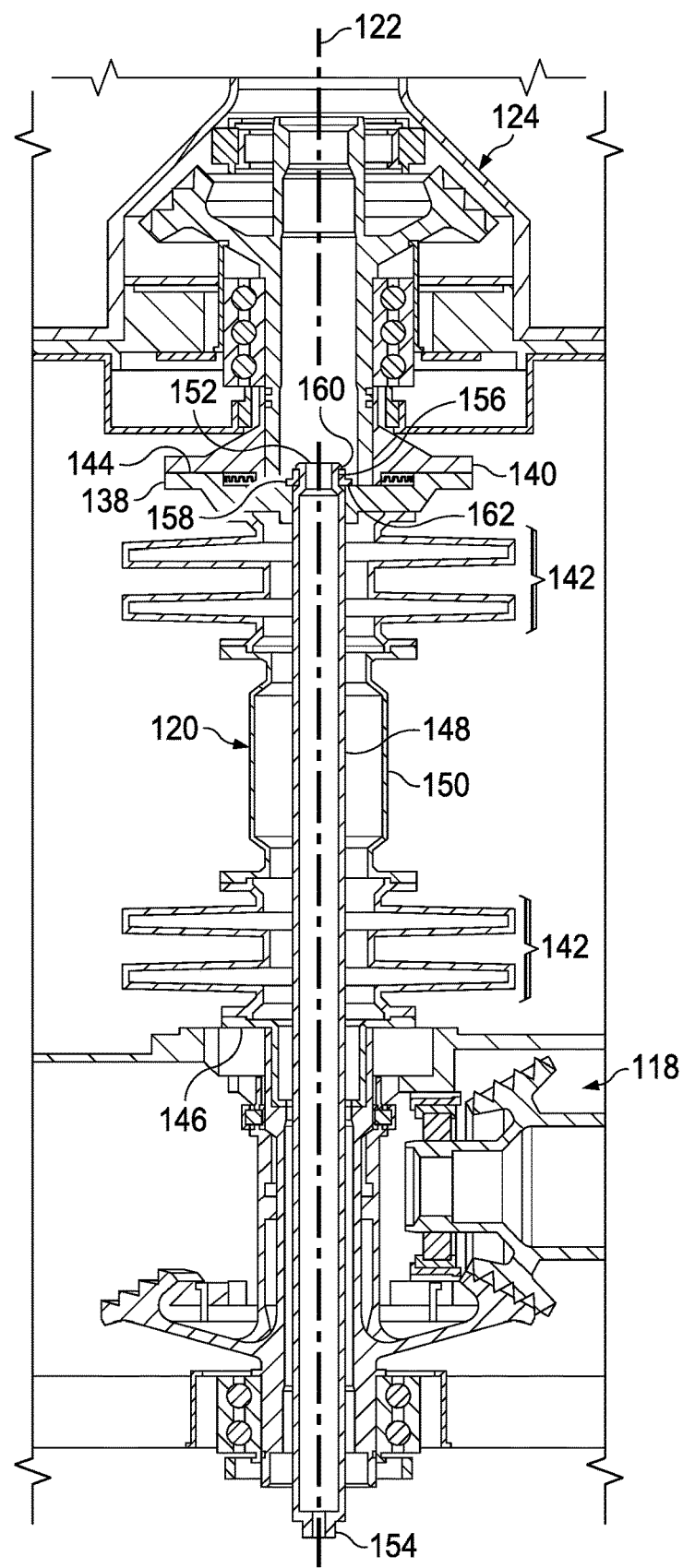
FIG. 5A is a cross-sectional side view of a compressible driveshaft for use with the stow system of FIG. 4A, shown in an engaged position.
Figure 5B:
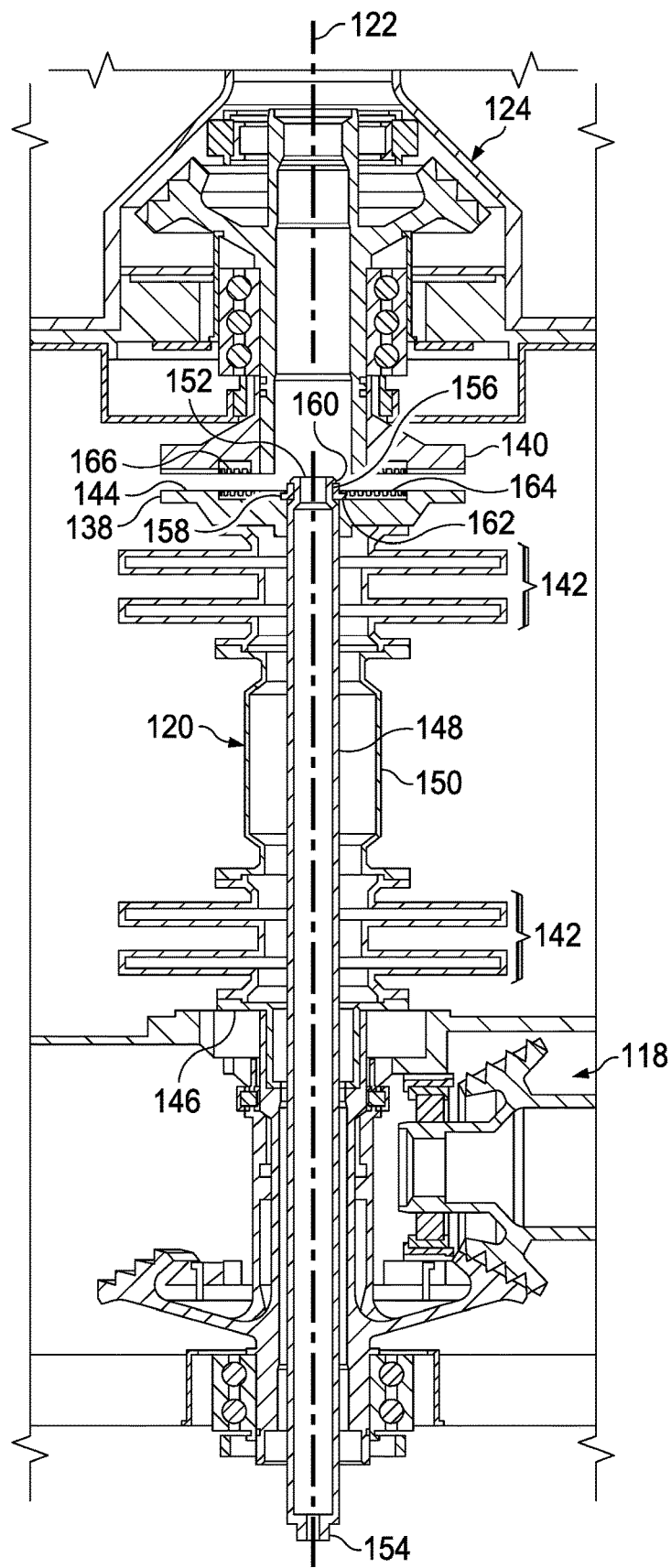
FIG. 5B is a cross-sectional side view of the compressible driveshaft for use with the stow system of FIG. 4A, shown in a disengaged position.

FIGS. 4A-4C, side views of stow system 136 of aircraft 100 of FIGS. 1-3 are shown according to this disclosure. Moreover, FIGS. 4A and 5A show compressible driveshaft 120 in an engaged configuration wherein compressible driveshaft 120 is expanded and engaged with mid-wing gearbox 124 and wing assembly 104 in the flight position, FIGS. 4B and 5B show compressible driveshaft 120 in a disengaged configuration wherein compressible driveshaft 120 is compressed and disengaged from mid-wing gearbox 124 and wing assembly 104 in the flight position, and FIG. 4C shows compressible driveshaft 120 compressed and disengaged from mid-wing gearbox 124 and wing assembly 104 rotated about stow axis 134 into the stowed position. Compressible driveshaft 120 and mid-wing gearbox 124 may comprise an interface designed to properly align an engagement portion 138 of compressible driveshaft 120 and a mating surface 140 of mid-wing gearbox 124 when compressible driveshaft 120 is being expanded to engage mid-wing gearbox 124. Proper alignment of engagement portion 138 and mating surface 140 may be facilitated by utilizing one or more position sensors (not shown) in conjunction with a rotor phasing unit (not shown). The rotor phasing unit may be used to determine the rotational position of mating surface 140 and the position sensors may be used to determine the rotational position of engagement portion 138. With the relative positions known, compressible driveshaft 120 may be rotated the required amount for proper alignment of engagement portion 138 and mating surface 140.

In operation, compressible driveshaft 120 is expanded and compressed to engage and disengage from, respectively, mid-wing gearbox 124. Expansion and compression of compressible driveshaft 120 is possible because of the inclusion of one or more compressible sections 142 in compressible driveshaft 120. Compressible sections 142 include elastically deformable elements (not shown) configured to, absent sufficient axial loading, maintain compressible sections 142 in a fully expanded configuration. Compressible sections 142 are configured to compress under a known axial load and are only permitted to compress a known amount, thereby preventing plastic deformation thereof. In the embodiment shown, compressible sections 142 comprise diaphragm couplings. However, any mechanically viable means of creating compressibility may be utilized. Compression of compressible sections 142, and therefore compressible driveshaft 120, is accomplished by a compressive force applied to compressible driveshaft 120 anywhere between a first end 144 and compressible section 142. The compressive force being directed along rotation axis 122 towards a second end 146, and second end 146 being axially fixed in place. When the applied compressive force exceeds the expansive force of the elastically deformable elements (not shown), compressible sections 142 compress, thereby reducing the length of compressible driveshaft 120.

In the embodiment shown, the compressive force is applied to compressible driveshaft 120 by an actuator rod 148 that extends through a hollow interior channel 150 of compressible driveshaft 120. Actuator rod 148 includes a top end 152 configured to engage first end 144 of compressible driveshaft 120 and a bottom end 154 configured to be coupled to an actuator (not shown). To facilitate insertion of actuator rod 148 through interior channel 150 during assembly, an outer diameter of actuator rod 148 must be less than an inner diameter of interior channel 150. Accordingly, the structure for engaging first end 144 should be installed after insertion through interior channel 150. As such, actuator rod 148 includes a groove 156 at top end 152 and an annular flange 158 installed in groove 156. Annular flange 158 may be coupled to actuator rod 148 by a nut 160. Annular flange 158 has a larger outer diameter than the inner diameter of interior channel 150 and a bottom surface 162 configured to bear against first end 144 of compressible driveshaft 120. The actuator translates actuator rod 148 along rotation axis 122. The actuator may be actuated electrically, electro-mechanically, hydraulically, and/or mechanically. For example, in some embodiments, actuator rod 148 may be extended and retracted by a rack and pinion. However, in other embodiments, actuator rod 148 may be extended and retracted by a machine screw type system.

When compressible driveshaft 120 is in the engaged configuration, as shown in FIGS. 4A and 5A, compressible sections 142 are expanded and engagement portion 138 is engaged with mating surface 140 of mid-wing gearbox 124. In this configuration, actuator rod 148 is not applying any force to compressible driveshaft 120. When it is no longer desired to transfer torque from engine reduction gearbox 118 to mid-wing gearbox 124, compressible driveshaft 120 may be transitioned to the disengaged configuration, as shown in FIGS. 4B and 5B. Before disengaging compressible driveshaft 120 from mid-wing gearbox 124, the torque differential between engagement portion 138 and mating surface 140 should be zero. Disengagement is commenced when the actuator causes actuator rod 148 to translate along rotation axis 122 towards second end 146. The translation of actuator rod 148 causes a compressive force to be transmitted from bottom surface 162 of annular flange 158 to first end 144 of compressible driveshaft 120. When the compressive force applied by actuator rod 148 exceeds the expansive force of compressible sections 142, compressible sections 142 begin to compress, thereby decreasing the length of compressible driveshaft 120 and disengaging engagement portion 138 from mating surface 140. For the operation in the embodiment shown, the length of compressible driveshaft 120 may be decreased by one-half inch or more. However, less compression may be acceptable for different utilizations of compressible driveshaft 120. After compressible driveshaft 120 is transitioned to the disengaged configuration, wing assembly 104 may be rotated relative to fuselage 102 about stow axis 134 until wing assembly 104 reaches the stowed position as shown in FIG. 4C. Once stow system 136 of aircraft 100 is configured as shown in FIGS. 3 and 4C, aircraft 100 may be parked, stowed, and/or driven into an entrance of a hangar while reducing the overall footprint of aircraft 100, thereby allowing for more compact storage of aircraft 100. Optionally, if no part of wing assembly 104 is located above compressible driveshaft 120 while aircraft 100 is in the stowed position, the compressive force applied by actuator rod 148 may be released, allowing compressible driveshaft 120 to be stored in the relaxed state.

To prepare aircraft 100 for flight from the stowed position shown in FIG. 4C, wing assembly 104 is rotated relative to fuselage 102 about stow axis 134 until wing assembly 104 reaches the flight position shown in FIG. 4B. Thereafter, the compressive force applied by actuator rod 148 is released from compressible driveshaft 120, allowing compressible sections 142 to expand and increase the length of compressible driveshaft 120 until engagement portion 138 engages with mating surface 140 of mid-wing gearbox 124, as shown in FIGS. 2, 4A, and 5A, wherein aircraft 100 is configured for flight.

Engagement portion 138 and mating surface 140 may comprise any configuration that is mechanically sufficient to transmit the required torque therebetween. As such, engagement portion 138 and mating surface 140 may comprise longitudinal splines parallel to rotation axis 122, or in operations that transfer less torque, friction plates or bevel gears. However, given the high torque transfer required in the embodiment shown, and a desire to minimize the amount of compression required for disengagement, engagement portion 138 and mating surface 140 comprise a face spline 164 and a face spline 166, respectively. As mentioned above, to ensure proper alignment of the complementary teeth of face spline 164 and face spline 166, position sensors (not shown) may be utilized in conjunction with the rotor phasing unit (not shown) to determine the relative positions of the teeth. With the relative positions known, compressible driveshaft 120 may be rotated the required amount for proper alignment of the teeth. Once the teeth are properly aligned, the compressive force applied by actuator rod 148 may be released, allowing face spline 164 to move into cooperative engagement with face spline 166. Alternatively, engagement portion 138 and mating surface 140 may include features configured to correct misalignment therebetween. For example, engagement portion 138 and mating surface 140 may include pointed teeth which cause relative rotational between the engagement portion 138 and mating surface 140 during engagement therebetween.

Because engagement of compressible driveshaft 120 must be maintained with mid-wing gearbox 124 in order to maintain flight of aircraft 100, it is imperative that that engagement is failsafe. As discussed above, the expansive force of compressible sections 142 cause the engagement of engagement portion 138 with mating surface 140. While this expansion force alone may be sufficient to maintain that engagement, it may be advisable to utilize a locking mechanism to maintain the engagement. Accordingly, any of the locking mechanisms described below may be utilized to retain engagement portion 138 in cooperative engagement with mating surface 140. In addition, locking engagement portion 138 to mating surface 140 will allow compressible sections 142 to absorb axial forces without risk of disengagement. Moreover, a difference in the outer diameter of actuator rod 148 and inner diameter of interior channel 150 will enable compressible section 142 to deflect slightly off-axis, thereby enabling compressible driveshaft 120 to allow for some axial misalignment between engine reduction gearbox 118 and mid-wing gearbox 124 during operation without, risk of disengagement.

Figure 6A:
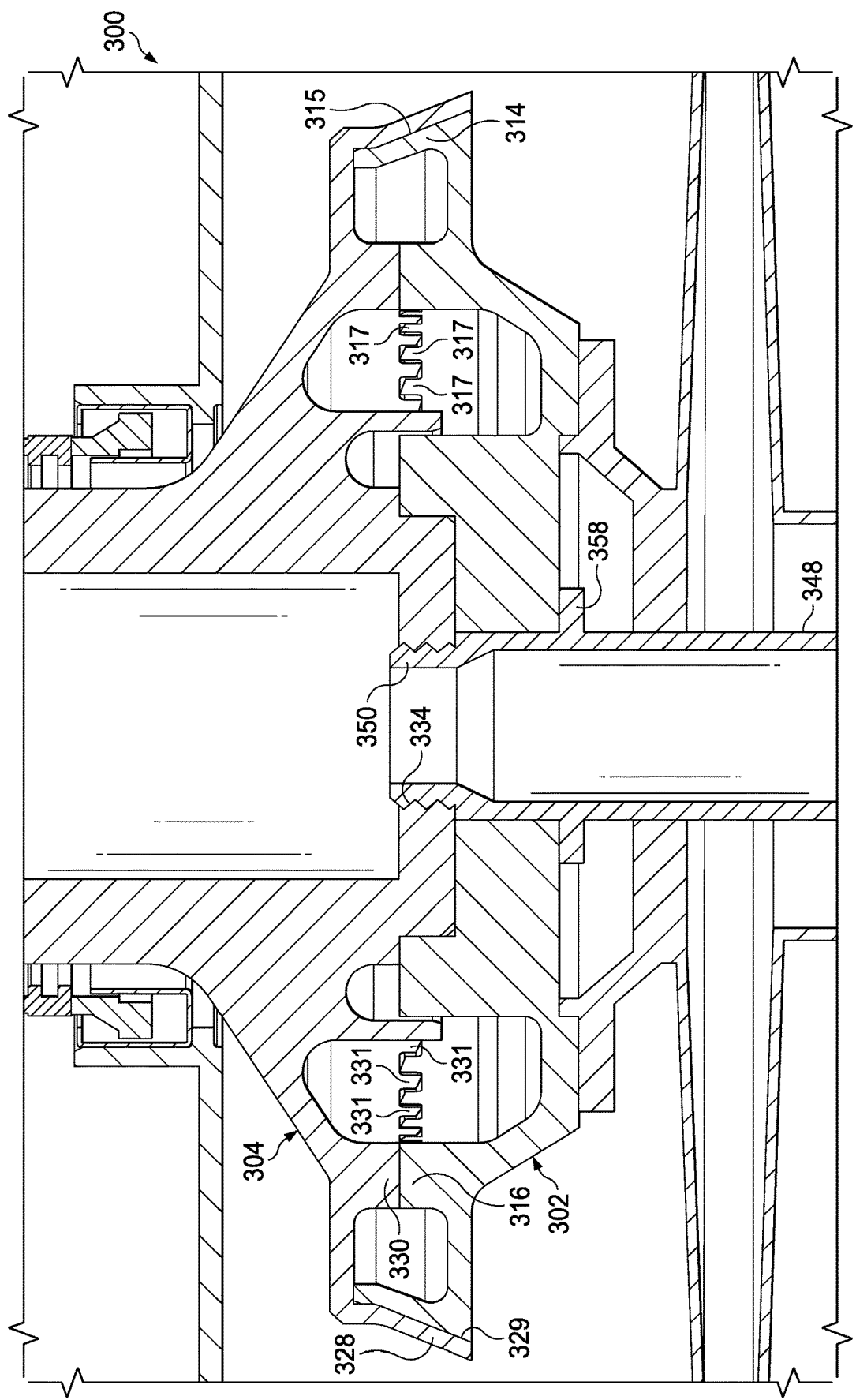
FIG. 6A is a cross-sectional side view of a locking mechanism for locking the compressible driveshaft in the engaged position, shown in a locked position.
Figure 6B:
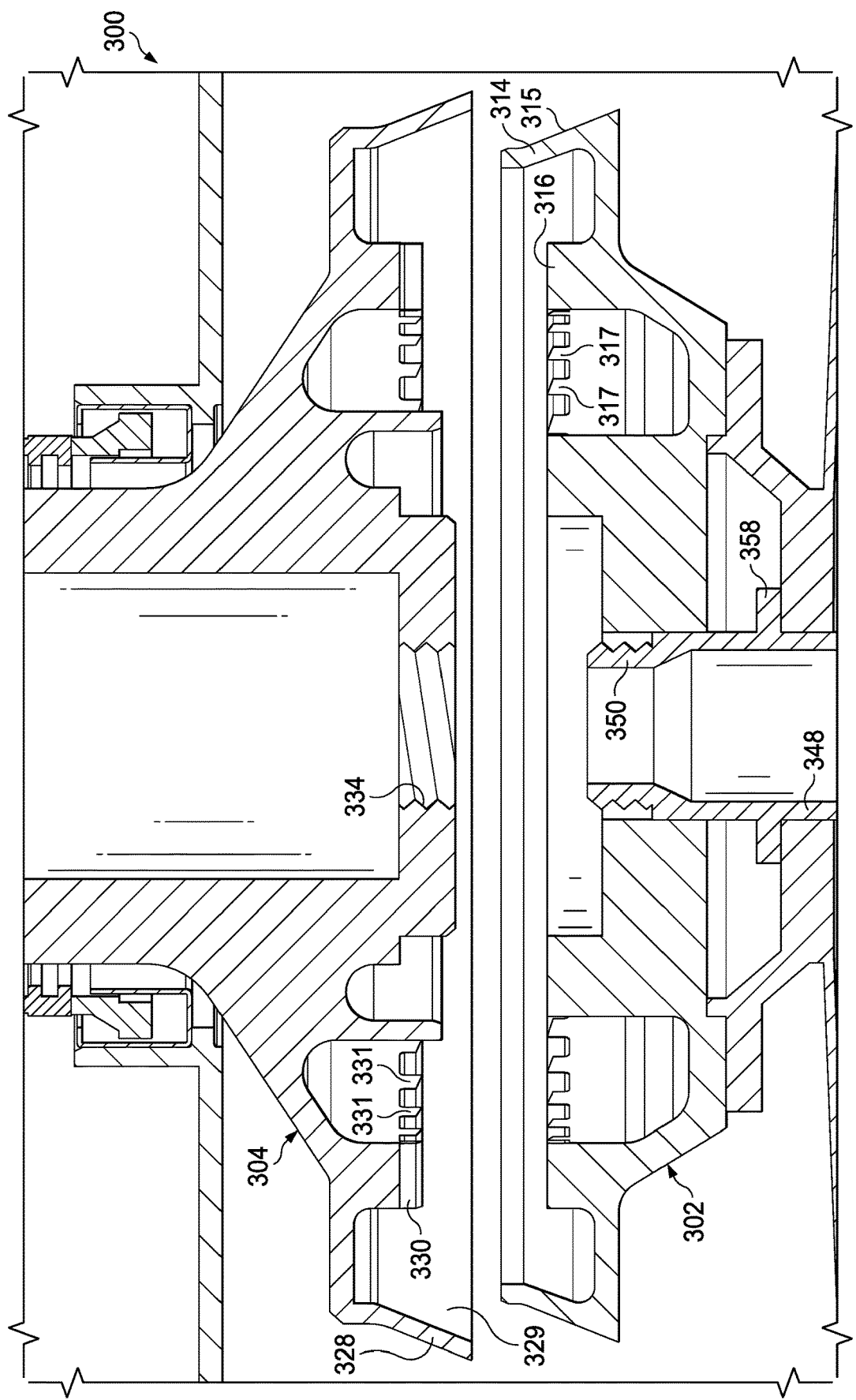
FIG. 6B is a cross-sectional side view of the locking mechanism for locking the compressible driveshaft in the engaged position, shown in an unlocked position.

A rotational locking system 300 for use with compressible driveshaft 120 is shown in FIGS. 6A and 6B. Locking system 300 includes a driveshaft portion 302 that replaces engagement portion 138 of compressible driveshaft 120, gearbox portion 304 that replaces mating surface 140 of mid-wing gearbox 124, and an actuator shaft 348 to replace actuator rod 148. Driveshaft portion 302 includes an alignment rim 314 located around a perimeter of driveshaft portion 302 that has a sloped outer surface 315 configured to correct axial misalignment during engagement, and a splined portion 316 including a plurality of splines 317. Gearbox portion 304 includes an alignment ring 328 having a sloped inner surface 329 configured to cooperate with sloped outer surface 315 of alignment rim 314 to correct axial misalignment during engagement, a splined section 330 including a plurality of splines 331, and a threaded opening 334 configured to receive a portion of actuator shaft 348 therein. Actuator shaft 348 includes a threaded end 350 configured to be threaded into threaded opening 334 of gearbox portion 304, and a flange 358 configured to bear against a bottom surface of driveshaft portion 302 and a top surface of compressible section 142.

FIG. 6A shows locking system 300 in a locked position. In the locked position, threaded end 350 of actuator shaft 348 is threaded into threaded opening 334 of gearbox portion 304 and flange 358 bears against driveshaft portion 302, thereby clamping driveshaft portion 302 and gearbox portion 304 towards each other. To unlock locking system 300 and disengage compressible driveshaft 120, actuator shaft 348 is rotated to unthread threaded end 350 from threaded opening 334 and then the actuator (not shown) translates actuator shaft 348 along rotation axis 122 towards second end 146 of compressible driveshaft 120. Translation of actuator shaft 348 causes flange 358 to apply a compressive force against, and cause the compression of, compressible section 142. Compression of compressible section 142 decreases the length of compressible driveshaft 120 and pulls splined portion 316 of driveshaft portion 302 out of engagement with splined section 330 of gearbox portion 304, as shown in FIG. 6B.

Reengagement of compressible driveshaft 120 and locking system 300 is done by first releasing the compressive force applied thereto through actuator shaft 348. As the compressive force is released, compressible sections 142 begin to expand. As driveshaft portion 302 approaches gearbox portion 304, first contact is made between sloped outer surface 315 and sloped inner surface 329. Sloped surfaces 315, 329 guide compressible driveshaft 120 into proper axial alignment with mid-wing gearbox 124. In addition, sloped surfaces 315, 329 may include cooperating teeth (not shown) that cause relative rotation between driveshaft portion 302 and gearbox portion 304 to properly align plurality of splines 317 with plurality of splines 331. After meshing of plurality of splines 317 with plurality of splines 331, threaded end 350 is threaded into threaded opening 334, thereby locking locking system 300, as shown in FIG. 6A.

Figure 7:
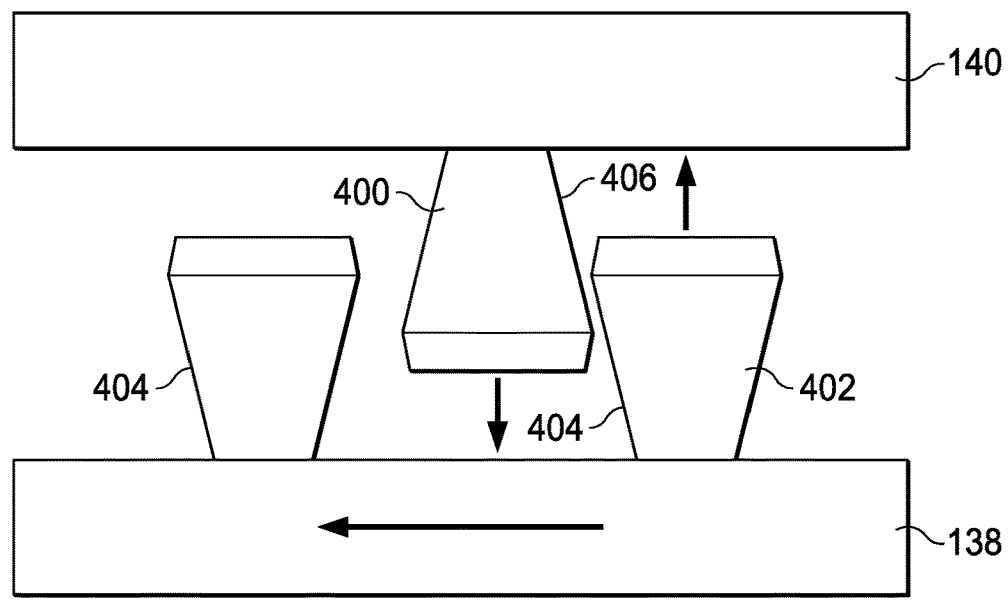
FIG. 7 is a side view of a portion of an alternative locking mechanism for locking the compressible driveshaft in the engaged position, shown in a locked position.
Figures 8A, 8B:
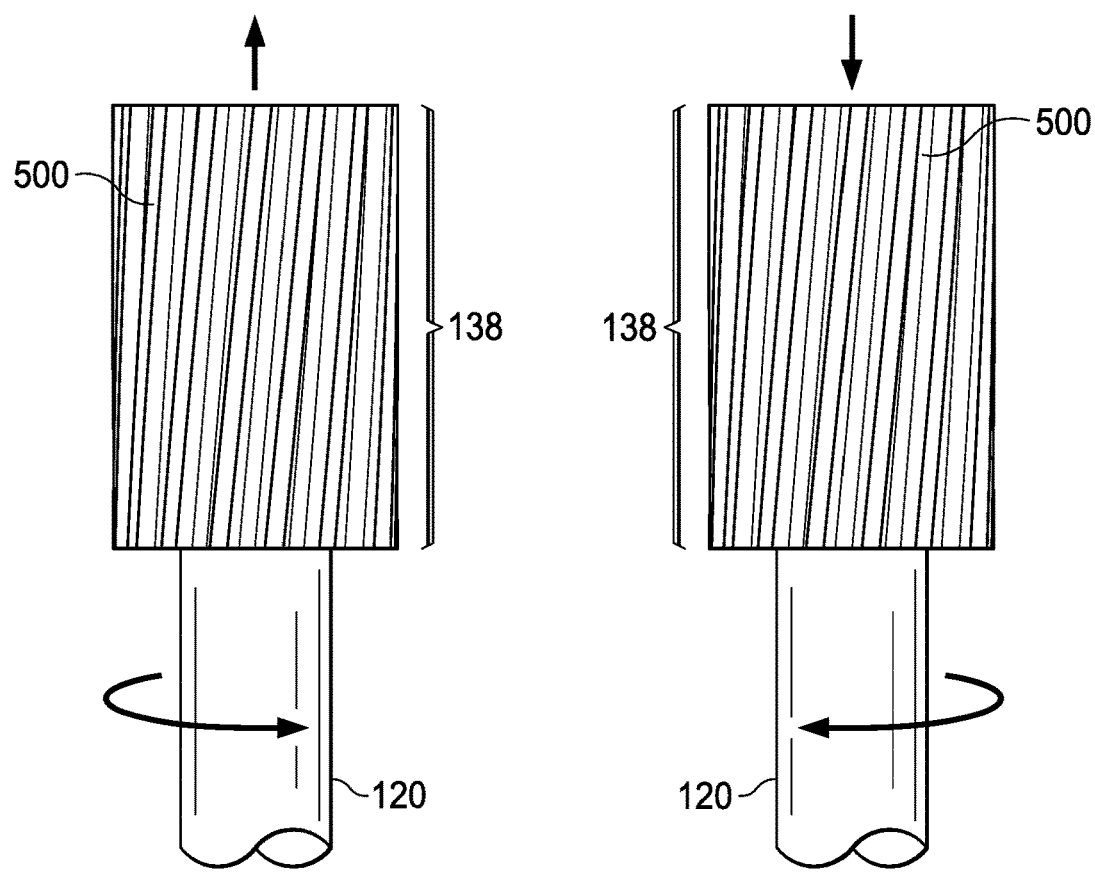
FIG. 8A is a side view of another alternative locking mechanism for locking the compressible driveshaft in the engaged position, shown in a locked position.
FIG. 8B is a side view of the alternative locking mechanism for locking the compressible driveshaft in the engaged position, shown in an unlocked position.

In lieu of a locking system, FIGS. 7-8B show spline arrangements that produce axial forces that draw compressible driveshaft 120 and mid-wing gearbox 124 together. As shown in FIG. 7, optional driven teeth 400 extend from mating surface 140 of mid-wing gearbox 124 and drive teeth 402 extend from engagement portion 138. When torque is applied to engagement portion 138, sloped surfaces 404 of drive teeth 402 contact sloped surfaces 406 of driven teeth 400. The torque differential between drive teeth 402 and driven teeth 400 causes a clamping force between engagement portion 138 and mating surface 140. When there is no torque differential, there is no clamping force to oppose the compressive force applied by actuator rod 148, and compressible driveshaft 120 may be compressed as described above.

As shown in FIGS. 8A and 8B, engagement portion 138 comprises helical splines 500. Helical splines 500 are configured to be inserted into complementary helical grooves (not shown) on mating surface 140. Helical splines 500 operate in largely the same manner as drive teeth 402, described above. That is, the torque differential between helical splines 500 and the complementary helical grooves (not shown) cause a clamping force that draws compressible driveshaft 120 and mid-wing gearbox 124 together. However, rotating compressible driveshaft 120 opposite the drive direction will cause disengagement of compressible driveshaft 120 from mid-wing gearbox 124, enabling compression of compressible driveshaft 120 as described above.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A driveshaft, comprising:
a first end, a second end, a length extending from the first end to the second end, and a rotation axis;
an engagement portion at the first end of the driveshaft, the engagement portion being configured to cooperatively engage and transfer torque to an apparatus; and
a compressible section configured to selectively decrease the length of the driveshaft;
wherein the driveshaft is configured to transition between an engaged configuration, wherein the engagement portion is engaged with the apparatus, and a disengaged configuration, wherein the compressible section is compressed, and the engagement portion is disengaged from the apparatus;
wherein the compressible section is configured as a primary torque load path between the apparatus and the driveshaft; and
wherein compression of the compressible section comprises a lengthwise shortening of the compressible section that is attributable to elastic deformation of the compressible section.

2. The driveshaft of claim 1, further comprising:
a hollow interior channel configured to receive an actuator rod therein.

3. The driveshaft of claim 2, wherein the compressible section comprises a diaphragm coupling.

4. The driveshaft of claim 3, wherein the engagement portion comprises a face spline.

5. The driveshaft of claim 4, wherein the compressible section is configured to be compressed by an axial force transmitted thereto by the actuator rod.

6. The driveshaft of claim 5, wherein the length of the driveshaft may be decreased by at least one-half of an inch when compressed.

7. A method of engaging a driveshaft with an apparatus, comprising:
  providing the driveshaft, comprising:
   a first end, a second end, a length extending from the first end to the second end, and a rotation axis; and
   an engagement portion at the first end of the driveshaft, the engagement portion being configured to cooperatively engage and transfer torque to the apparatus; and
  releasing a compressive force applied to a compressible section the driveshaft along the rotation axis, wherein releasing the compressive force allows the length of the driveshaft to increase, thereby causing the engagement portion to cooperatively engage the apparatus;
  wherein the compressible section of the driveshaft is configured as a primary torque load path between the apparatus and the driveshaft; and
  wherein compression of the compressible section comprises a lengthwise shortening of the compressible section that is attributable to elastic deformation of the compressible section.

8. The method of claim 7, further comprising:
  utilizing position sensors to align the engagement portion with the mating surface of the apparatus.

9. The method of claim 7, further comprising:
  disengaging the driveshaft from the apparatus by applying a compressive force, wherein the compressive force unlocks the engagement portion of the driveshaft from the mating surface of the apparatus and compresses the driveshaft, thereby reducing the length of the driveshaft enough to disengage the engagement portion of the driveshaft from the mating surface of the apparatus.

10. An aircraft, comprising:
  a fuselage;
  a gearbox including a mating surface configured to receive torque; and
  a driveshaft, comprising:
   a first end, a second end, a length extending from the first end to the second end, and a rotation axis;
   an engagement portion at the first end of the driveshaft, the engagement portion being configured to cooperatively engage the mating surface of the gearbox; and
   a compressible section configured to selectively decrease the length of the driveshaft;
   wherein the driveshaft is configured to transition between an engaged configuration, wherein the engagement portion is engaged with the mating surface of the gearbox, and a disengaged configuration, wherein the compressible section is compressed, and the engagement portion is disengaged from the mating surface of the gearbox.

11. The aircraft of claim 10, wherein the compressible section comprises a diaphragm coupling.

12. The aircraft of claim 11, further comprising:
  an actuator rod extending along a hollow interior of the driveshaft, the actuator rod being configured to apply a compressive force to the driveshaft along the rotation axis.

13. The aircraft of claim 12, wherein the engagement portion comprises a face spline.

14. The aircraft of claim 13, further comprising:
  a position sensor configured to determine alignment of the face spline in relation to the mating surface of the gearbox.

* * * * *